US012562522B2

(12) United States Patent
Ilie

(10) Patent No.: US 12,562,522 B2
(45) Date of Patent: Feb. 24, 2026

(54) ELECTRICAL CONNECTOR COMPRISING A USER PROTECTIVE SYSTEM

(71) Applicant: ULTRATECH, Le Chesnay (FR)

(72) Inventor: Razvan Ilie, Rocquencourt (FR)

(73) Assignee: ULTRATECH, Le Chesnay (FR)

( * ) Notice: Subject to any disclaimer, the term of this patent is extended or adjusted under 35 U.S.C. 154(b) by 309 days.

(21) Appl. No.: 18/207,078

(22) Filed: Jun. 7, 2023

(65) Prior Publication Data

US 2023/0402785 A1 Dec. 14, 2023

(30) Foreign Application Priority Data

Jun. 8, 2022 (FR) ..................................... 22 05491

(51) Int. Cl.
*H01R 13/453* (2006.01)
*H01R 13/11* (2006.01)
*H01R 13/187* (2006.01)

(52) U.S. Cl.
CPC ....... *H01R 13/4538* (2013.01); *H01R 13/111* (2013.01); *H01R 13/187* (2013.01)

(58) Field of Classification Search
CPC ................ H01R 13/111; H01R 13/187; H01R 13/4538; H01R 13/18; H01R 13/04; H01R 13/44
See application file for complete search history.

(56) References Cited

U.S. PATENT DOCUMENTS

| | | | | |
|---|---|---|---|---|
| 9,748,688 | B2 * | 8/2017 | Hagmann | H01R 13/111 |
| 10,903,596 | B2 * | 1/2021 | Ilie | H01R 13/18 |
| 2009/0163066 | A1 * | 6/2009 | Vanzo | H01R 13/625 439/314 |
| 2017/0141507 | A1 * | 5/2017 | Tucker | H01R 13/523 |

(Continued)

FOREIGN PATENT DOCUMENTS

| | | | | |
|---|---|---|---|---|
| DE | 1202374 B * | 10/1965 | | H01R 13/53 |
| EP | 3121908 A1 | 1/2017 | | |
| EP | 3208892 A1 | 8/2017 | | |

(Continued)

OTHER PUBLICATIONS

DE 1202374 English Translation (Year: 2025).*
French Application No. 22 05491, Search Report mailed Jan. 18, 2023, 2 pages.

*Primary Examiner* — Tulsidas C Patel
*Assistant Examiner* — Carlos E Lopez-Pagan
(74) *Attorney, Agent, or Firm* — B. Aaron Schulman, Esq.; Stites & Harbison, PLLC

(57) ABSTRACT

An electrical connector is provided which has a male contact and a female contact movable between an uninserted configuration and an inserted configuration, wherein the male contact is inserted along an axis of insertion into a housing of the female contact. The female contact includes a body, a plurality of blades, and a protective system that has an insulating jacket surrounding the blades, an insulating component movable in axial translation with respect to the body between a rest position, wherein the insulating component at least partially closes the housing and abuts axially against the female contact, and a pushed-in position, wherein the insulating component is pushed towards the bottom of the housing by the male contact, and a mechanism for returning the insulating component to the rest position.

9 Claims, 4 Drawing Sheets

(56) References Cited

U.S. PATENT DOCUMENTS

Figure 1:
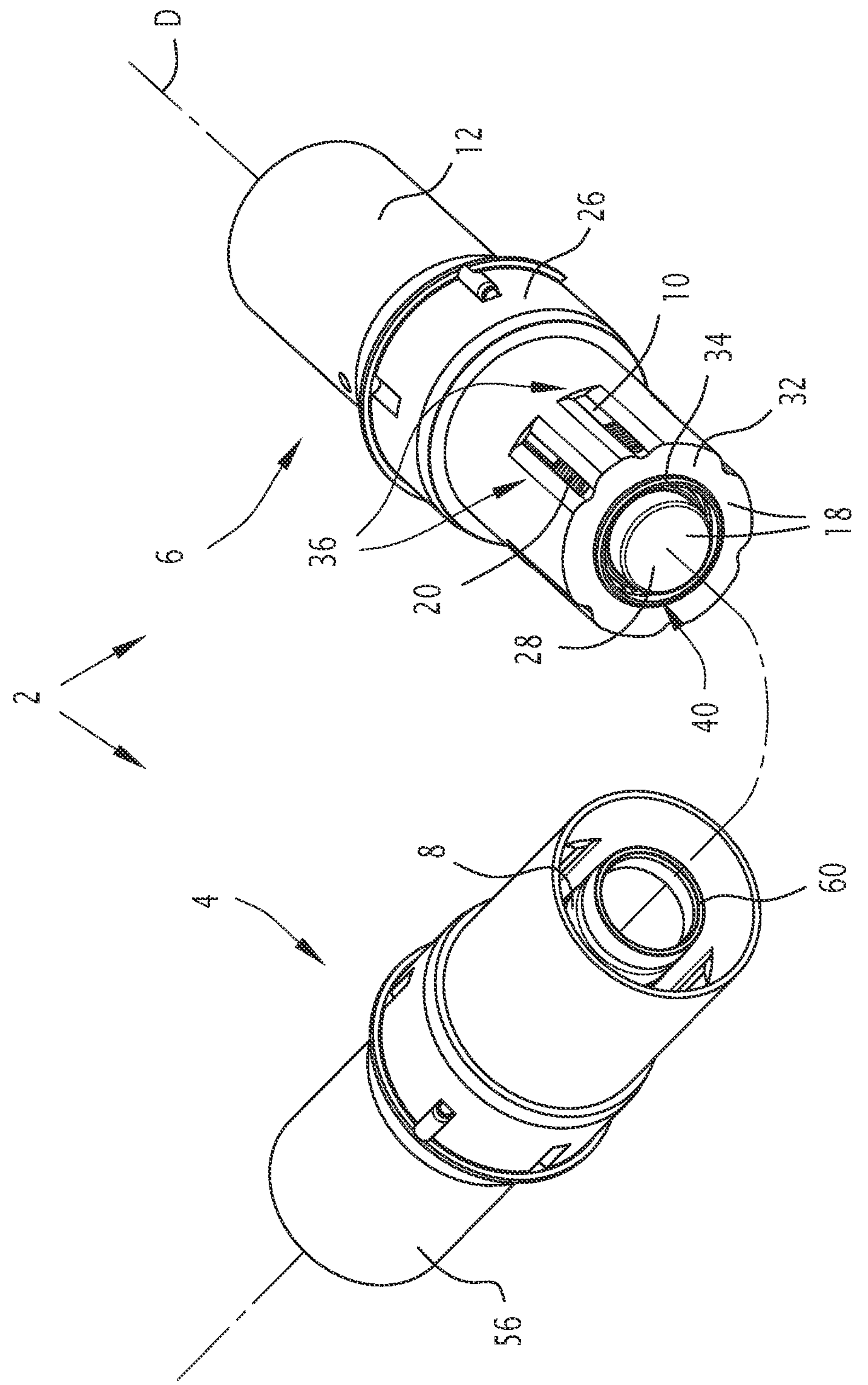

| | | | | |
|---|---|---|---|---|
| 2017/0244196 | A1* | 8/2017 | Ilie | H01R 13/111 |
| 2021/0210887 | A1* | 7/2021 | Kliever | H01R 13/04 |

FOREIGN PATENT DOCUMENTS

| | | | |
|---|---|---|---|
| EP | 3644450 | A1 | 4/2020 |
| GB | 1203852 | A | 9/1970 |
| GB | 2228631 | A | 8/1990 |

* cited by examiner

ELECTRICAL CONNECTOR COMPRISING A USER PROTECTIVE SYSTEM

CROSS-REFERENCE TO RELATED APPLICATIONS

This application claims priority to French Application No. FR 22 05491 filed Jun. 8, 2022, the entire disclosure of which is incorporated herein by reference.

BACKGROUND OF THE INVENTION

Field of the Invention

An electrical connector including a male contact and a female contact movable between an uninserted configuration, wherein the male contact is separated from the female contact, and an inserted configuration, wherein an electrically conductive insertable portion of the male contact is inserted along an axis of insertion into a housing defined by the female contact, the female contact including a protective system for protecting a user.

Description of Related Art

The electrical connector is e.g. a power connector, i.e. same is suitable for transmitting a current of intensity greater than or equal to 10 A. Such a connector generates a risk for a user who would come into electrical contact with the male contact or the female contact.

In order to reduce or eliminate such risk, it is known how to place caps on the contacts. However, the caps should be removed before placing the connector in the inserted configuration. The above makes the use complex and exposes the user to the risk when the caps are removed and the connection is not yet made.

To overcome such drawback, permanent protections have been implemented. E.g. documentEP 3 644 450 A1 of the Applicant describes a connector including an insulator inserted into the housing formed by the female contact. The insulator includes a cylindrical cage, and a central finger extending axially. The space between the finger and the cage bars is small and prevents a user from directly touching the blades of the female contact.

In the inserted configuration, the finger of the insulator is received in a recess in the insertable portion of the male contact, and the insertable portion is received between the finger and the cage bars. Therefore, the male contact and the insulator are quite complex to manufacture.

Furthermore, while the insulator reduces the risk of contact, same does not prevent a user or a person from indirectly touching the blades by inserting a conductive object into the housing.

A goal of the invention is thus to provide an electrical connector which reduces the risk of electric shock for a user or a person, while making possible an effective electrical connection which is simple to manufacture and has a competitive price.

BRIEF SUMMARY OF THE INVENTION

To this end, the invention relates to an electrical connector including a male contact and a female contact movable between an uninserted configuration, wherein the male contact is separated from the female contact, and an inserted configuration, wherein an electrically conductive insertable portion of the male contact is inserted along an axis of insertion into a housing defined by the female contact, the female contact including:

- a body, and a plurality of blades protruding axially from the body and angularly distributed about the insertable portion in the inserted configuration, the blades being electrically conductive and radially flexible, the body and blades defining said housing, and
- a protective system for protecting a user, the protective system comprising:

- an electrically insulating jacket surrounding the blades around the axis of insertion and extending axially at least along the blades, the jacket being suitable for preventing a radial electrical contact between a user and the blades,
- an insulating component movable in axial translation with respect to the body between a rest position, intended for being occupied in the uninserted configuration, and wherein the insulating component at least partially closes an entry of the housing and prevents an axial electrical contact between the user and the blades, and a pushed-in position, intended for being occupied in the inserted configuration, wherein the insulating component is pushed towards a bottom of the housing by the male contact, with respect to the rest position, and
- at least one return mechanism suitable for returning the insulating component from the pushed-in position to the rest position, wherein the insulating component further abuts axially against a stop formed by the female contact.

According to particular embodiments, the electrical connector comprises one or a plurality of the following features, taken individually or according to all technically possible combinations:

- the return mechanism comprises a spring compressed axially and situated axially between the insulating component and the bottom of the housing;
- the insulating component includes a portion axially proximal with respect to the body, the proximal portion defining a housing suitable for receiving a distal end of the spring;
- the insulating component comprises a main part suitable for sliding into the housing, and a plurality of protrusions extending radially from the main part and engaged in axially extending interstices, each of the interstices being situated between two of the blades, the protrusions being suitable for sliding axially in the interstices between the rest position and the pushed-in position, and for abutting against said stop in the rest position;
- the protrusions form pins;
- the female contact further comprises at least one annular restraining component arranged around the blades, so as to press at least some of the blades against the insertable portion in the inserted configuration, the restraining component defining said stop;
- the jacket comprises an end portion forming a rim situated along an axial continuation of the blades and surrounding the axis of insertion, the rim being suitable for preventing an axial electrical contact between a user and distal ends of the blades with respect to the body, the rim defining the entry of the housing;
- the male contact further comprises: an insulating jacket surrounding the insertable portion about the axis of insertion and extending axially along the insertable portion, the jacket of the male contact being suitable for preventing a radial electrical contact between a user and the insertable portion; a body from which the insertable portion protrudes axially; and an insulating component covering a distal end of the insertable portion with respect to the body of the male contact, the insulating component of the male contact being suitable for preventing an axial electrical contact between a user and said distal end;

the insulating component of the male contact is suitable for being snap-fitted onto the distal end of the insertable portion; and the insulating component of the male contact and the insulating component of the female contact are suitable for fitting into each other, one partially encapsulating the other.

BRIEF DESCRIPTION OF THE SEVERAL VIEWS OF THE DRAWING(S)

Figure 2:
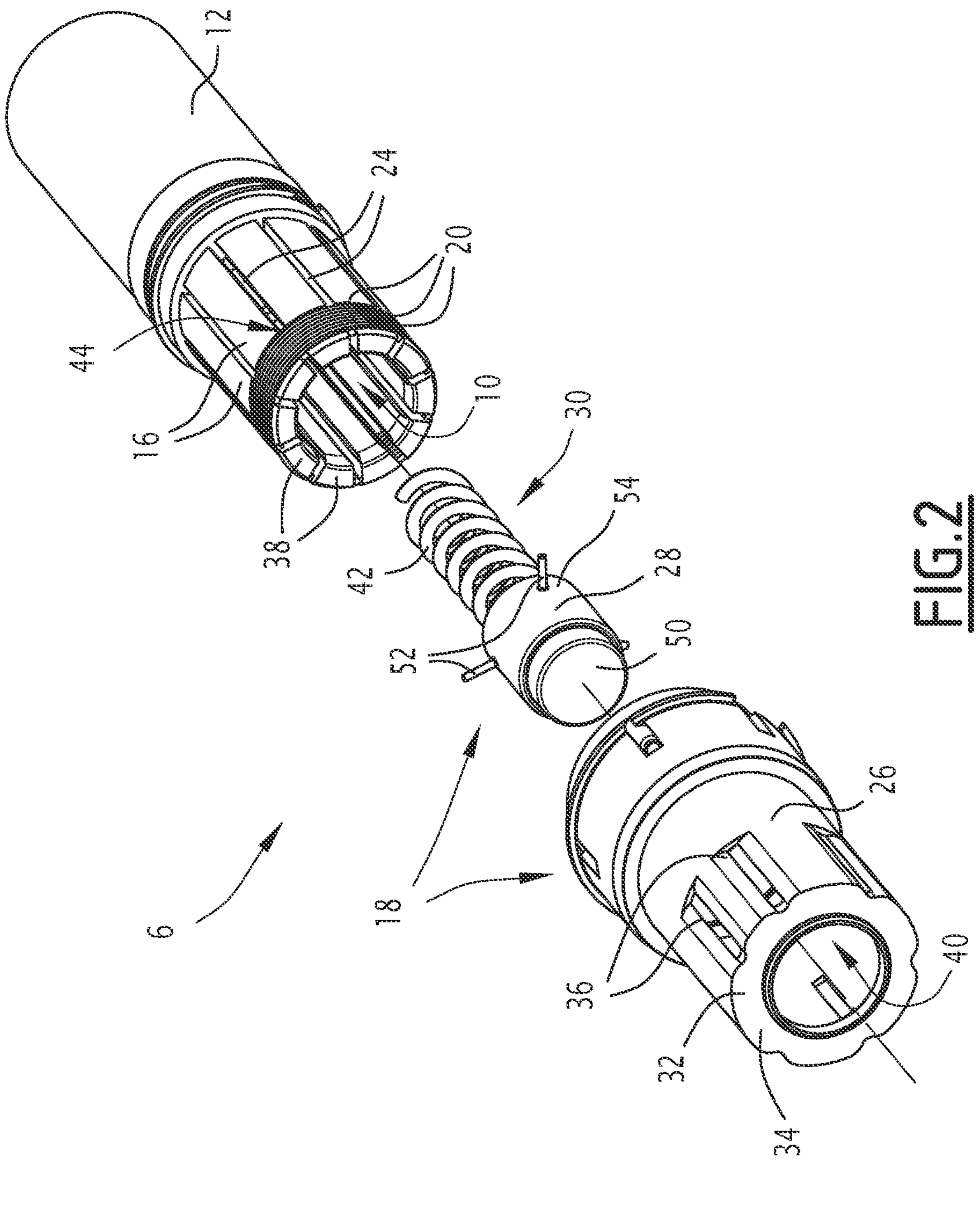
Figure 3:
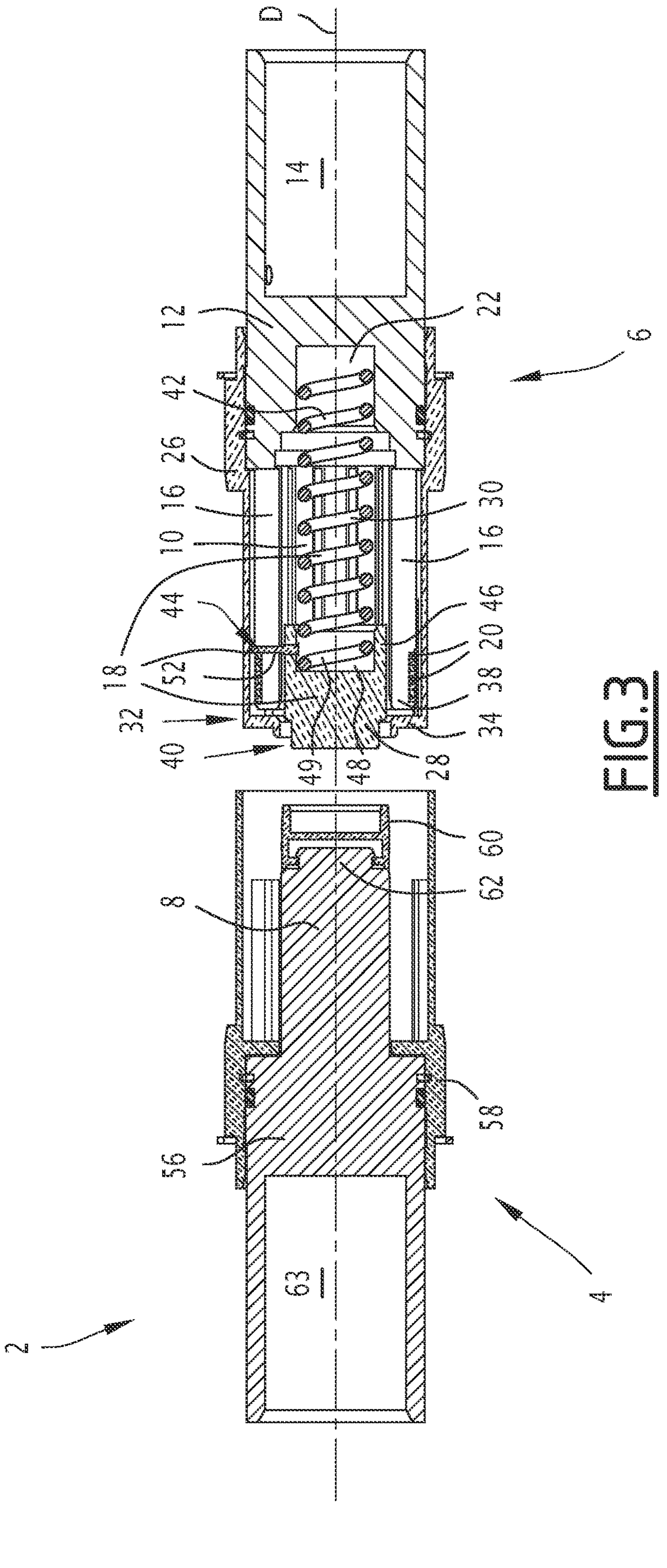
Figure 4:
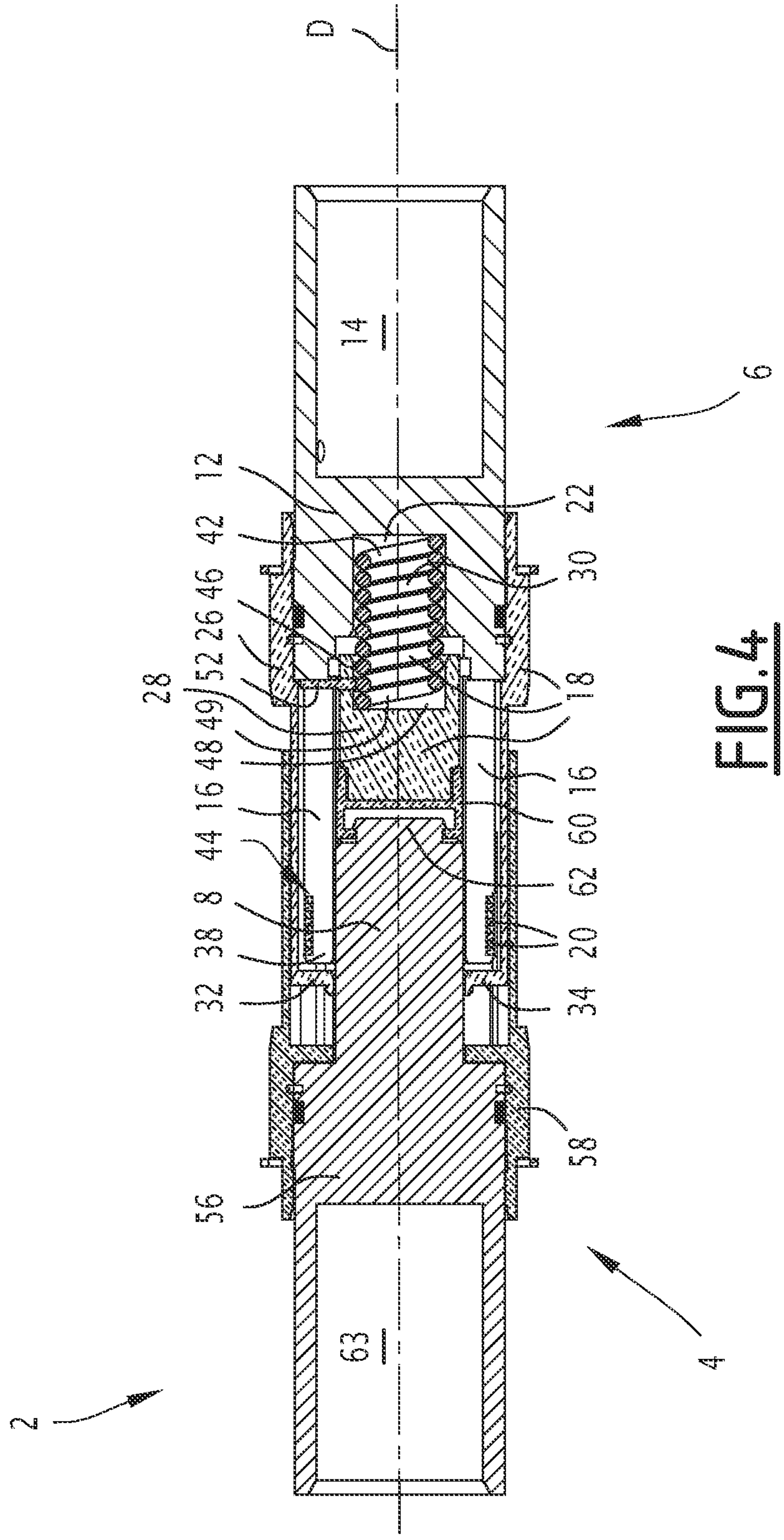

The invention will be better understood upon reading the following description, given only as an example and making reference to the enclosed drawings, wherein:

FIG. 1 is a perspective view of an electrical connector according to the invention in an uninserted configuration, FIG. 2 is an exploded perspective view of the female contact of the electrical connector shown in FIG. 1, FIG. 3 is an axial section view of the electrical connector shown in FIG. 1, in a uninserted configuration, the insulating component of the female contact being in the rest position thereof, and FIG. 4 is an axial section view of the connector shown in FIGS. 1 and 3, in an inserted configuration, the insulating component of the female contact being in the pushed-in position.

DETAILED DESCRIPTION OF THE INVENTION

With reference to FIGS. 1, 3 and 4, an electrical connector 1 according to the invention is described.

The electrical connector 2 comprises a male contact 4 and a female contact 6 movable between an inserted position (FIG. 4), wherein an electrically conductive insertable portion 8 of the male contact is inserted along an axis of insertion D into a housing 10 defined by the female contact, and an uninserted position (FIGS. 1 and 3), wherein the male contact is separated from the female contact.

"Distal" means, for each of the contacts, the side defined by the direction of insertion along the axis of insertion D. Correlatively, "proximal" means the side opposite to the insertion along the axis of insertion D.

For the purposes of the present application, "conductor" means a material the electrical resistivity of which is, at 300 K, e.g. less than or equal to $10^{-5}$ Ω·m. On the other hand, "insulator" means a material the electrical resistivity of which is, at 300 K, e.g. greater than or equal to $10^{5}$ Ω·m.

In the example, the male contact 4 and the female contact 6 are suitable for being in electrical contact on the distal side, with two electrical cables (not shown).

The female contact 6 comprises a body 12 advantageously defining a housing 14 for receiving one of the two electrical cables, and a plurality of blades 16 protruding axially from the body, and distributed angularly around the insertable portion 8 of the male contact 4 in the inserted configuration (FIG. 4). The female contact 6 comprises a protective system 18 for protecting a user (not shown).

In the example, the female contact 6 further comprises a plurality of annular restraining components 20 arranged around the blades 16, so as to press the blades against the insertable portion 8 in the inserted configuration.

According to variants (not shown), the female contact 6 comprises only one restraining component 20, or else does not comprise any.

The body 12 and the blades 16 are conductive. E.g. same are made of aluminum, aluminum alloy, copper or copper alloy. The body 12 and the blades 16 define the housing 10 receiving the insertable portion 8 in the inserted configuration.

The body 12 advantageously defines a recess 22, e.g. of cylindrical shape, at the bottom (on the proximal side) of the housing 10.

The blades 16 are radially flexible and define therebetween interstices 24 (FIG. 2) which extend axially. There are at least two blades 16. In the example shown, there are ten blades 16.

The blades 16 radially delimit the housing 10.

The protective system 18 comprises an insulating jacket 26 surrounding the blades 16 about the axis of insertion D and extending axially at least along the blades, the jacket being suitable for preventing a radial electrical contact between a user and the blades. The protective system 18 comprises an insulating component 28 movable in axial translation with respect to the body 12 between a rest position intended for being occupied in the uninserted configuration and a pushed-in position intended for being occupied in the inserted configuration. The protective system 18 comprises a return mechanism 30 suitable for returning the insulating component 28 from the pushed-in position to the rest position.

In the example, the jacket 26 also extends axially along a portion of the body 12. The jacket 26 is e.g. attached to the body 12.

On the distal side, the jacket 26 advantageously comprises an end part 32 forming a rim 34 situated along an axial continuation of the blades 16 and surrounding the axis of insertion D.

The jacket 26 advantageously has a general shape of revolution about the axis of insertion D, and defines e.g. openings 36 distributed angularly about the axis of insertion.

The openings 36 extend e.g. axially from the rim 34 along the proximal direction.

The rim 34 is advantageously suitable for preventing an axial electrical contact between a user and distal ends 38 of the blades 16. The rim 34 defines an entry 40 of the housing, through which the insulating component 28 extends in the rest position.

The return mechanism 30 comprises e.g. a spring 42 compressed axially and situated axially between the insulating component 28 and the bottom of the housing 10.

The spring 42 is situated partially in the recess 22 and bears e.g. onto the bottom of the recess.

In the rest position, the insulating component 28 is suitable for at least partially closing off the entry 40 of the housing 10 and preventing an either direct or indirect axial electrical contact between the user and the blades 16. In the rest position, the insulating component 28 abuts axially against a stop 44 formed by the female contact 6, in the example herein by one of the restraining components 20 (the most proximal one).

In the pushed-in position, the insulating component 28 is pushed towards the bottom of the housing 10 by the male contact 4 with respect to the rest position.

The insulating component 28 comprises e.g. a portion 46 axially proximal with respect to the body 12, the proximal portion defining a housing 48 suitable for receiving a distal end 49 of the spring 42 of the return mechanism 30.

The insulating component 28 comprises e.g. a main part 50 suitable for sliding in the housing 10, and a plurality of protrusions 52 extending radially from the main part and engaged in the interstices 24.

The main part 50 has e.g. a cylindrical radially outer surface 54.

In the example, there are three protrusions 52. The protrusions 52 are suitable for sliding axially in the interstices 24 between the rest position and the pushed-in position, and for abutting against the stop 44 in the rest position. The protrusions 52 form e.g. pins.

In addition to the insertable portion, the male contact 4 includes e.g. an electrically conductive body 56 from which the insertable portion 8 forms an axial protrusion.

Advantageously, the male contact 4 further comprises an electrically insulating jacket 58 surrounding the insertable portion 8 about the axis of insertion D and extending axially along the insertable portion 8. The male contact 4 advantageously comprises an insulating component 60 covering a distal end 62 of the insertable portion 8 with respect to the body 56.

The body 56 defines e.g. a housing 63 for one of the electric cables.

The jacket 58 is suitable for preventing a radial electrical contact between a user and the insertable portion 8. Advantageously, the jacket 58 extends axially along the body 56. The jacket 58 is e.g. attached to the body 56. The jacket 58 of the male contact 4 is e.g. suitable for covering the jacket 26 of the female contact 6 in the inserted configuration.

The insulating component 60 of the male contact 4 is suitable for preventing an axial electrical contact between a user and the distal end 62. The insulating component 60 is suitable e.g. for being snap-fitted onto the distal end 62.

The insulating component 60 of the male contact 4 and the insulating component 28 of the female contact 6 are e.g. suitable for fitting into each other, one partially encapsulating the other, in the inserted configuration.

How the electrical connector 2 works can be deduced from the structure thereof and will now be described briefly.

The electrical connector 2 is e.g. initially in the uninserted configuration (FIG. 1 or FIG. 3). The insulating component 28 of the female contact 6 is in the rest position and closes the inlet 40 of the housing 10. The return mechanism 30 holds the insulating component 28 in the rest position. The insulating component 28 abuts axially against the stop 44.

The jackets 26, 58 prevent or limit radial electrical contacts between the user and both the blades 6 and the insertable portion 8.

The insulating component 28 prevents axial electrical contact between the user and the blades 16.

Advantageously, the rim 34 of the jacket 26 prevents an axial electrical contact between the user and the distal ends 38 of the blades 16.

The electrical connector 2 is then placed in the inserted configuration. The insertable portion 8 is inserted into the housing 10. The male contact 4 pushes the insulating component 28 which switches, by axial translation, from the rest position to the pushed-in position. In the example, the protrusions 52 slide axially in the interstices 24. The jacket 58 of the male contact 4 covers the jacket 26 of the female contact 6.

By means of the features described hereinabove, the electrical connector 2 reduces the risk of electrical shock for a user or a person, while making possible an effective electrical connection which is simple to manufacture and has a competitive price.

The invention claimed is:

1. An electrical connector including a male contact and a female contact movable between an uninserted configuration, wherein the male contact is separated from the female contact, and an inserted configuration, wherein an electrically conductive insertable portion of the male contact is inserted along an axis of insertion into a housing defined by the female contact, the female contact comprising:

a body, and a plurality of blades protruding axially from the body and angularly distributed around the insertable portion in the inserted configuration, the blades being electrically conductive and radially flexible, the body and the blades defining said housing, and a protective system for protecting a user, the protective system comprising:

an electrically insulating jacket surrounding the blades about the axis of insertion and extending axially at least along the blades, the jacket being suitable for preventing a radial electrical contact between a user and the blades, an insulating component movable in axial translation with respect to the body between a rest position, suitable for being occupied in the uninserted configuration, and wherein the insulating component at least partially closes an entry of the housing and prevents an axial electrical contact between the user and the blades, and a pushed-in position suitable for being occupied in the inserted configuration, wherein the insulating component is pushed towards a bottom of the housing by the male contact with respect to the rest position, and at least one return mechanism suitable for returning the insulating component from the pushed-in position to the rest position, wherein the insulating component also abuts axially against a stop formed by the female contact;

wherein the insulating component comprises a main portion suitable for sliding in the housing, and a plurality of protrusions extending radially from the main portion, and engaged in interstices extending axially, each of the interstices being situated between two of the blades, the protrusions being suitable for sliding axially in the interstices between the rest position and the pushed-in position, and for abutting against said stop in the rest position.

2. The electrical connector according to claim 1, wherein the protrusions form pins.

3. The electrical connector according to claim 1, wherein the female contact further comprises at least one annular restraining component arranged around the blades, for pressing at least some of the blades onto the insertable portion in the inserted configuration, and wherein the at least one restraining component defines said stop.

4. The electrical connector according to claim 1, wherein the housing comprises an end portion forming a rim situated in an axial continuation of the blades and surrounding the axis of insertion, the rim being suitable for preventing an axial electrical contact between a user and distal ends of the blades with respect to the body, the rim defining the entry of the housing.

5. The electrical connector according to claim 1, wherein the return mechanism comprises an axially compressed spring situated axially between the insulating component and the bottom of the housing.

6. The electrical connector according to claim 5, wherein the insulating component includes a portion axially proximal with respect to the body, the proximal portion defining another housing, said another housing being suitable for receiving a distal end of the spring.

7. The electrical connector according to claim 1, wherein the male contact further comprises:

an insulating jacket surrounding the insertable portion about the axis of insertion and extending axially along the insertable portion, the jacket of the male contact being suitable for preventing a radial electrical contact between a user and the insertable portion, a body from which the insertable portion forms an axial protrusion, and an insulating component covering a distal end of the insertable portion with respect to the body of the male contact, the insulating component of the male contact being suitable for preventing an axial electrical contact between a user and said distal end.

8. The electrical connector according to claim 7, wherein the insulating component of the male contact is suitable for being snap-fitted onto the distal end of the insertable portion.

9. The electrical connector according to claim 7, wherein the insulating component of the male contact and the insulating component of the female contact are suitable for fitting into each other, one partially encapsulating the other.

* * * * *